US012035444B2

(12) United States Patent
Agnihotri

(10) Patent No.: US 12,035,444 B2
(45) Date of Patent: Jul. 9, 2024

(54) CAUSING A LIGHTING DEVICE TO VISUALLY INDICATE WHETHER IT CAN BE COMMISSIONED USING A PARTICULAR WIRELESS TECHNOLOGY

(71) Applicant: SIGNIFY HOLDING B.V., Eindhoven (NL)

(72) Inventor: Mohit Kumar Agnihotri, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 102 days.

(21) Appl. No.: 17/914,611

(22) PCT Filed: Mar. 26, 2021

(86) PCT No.: PCT/EP2021/057974

§ 371 (c)(1),
(2) Date: Sep. 26, 2022

(87) PCT Pub. No.: WO2021/198089

PCT Pub. Date: Oct. 7, 2021

(65) Prior Publication Data

US 2023/0123882 A1 Apr. 20, 2023

(30) Foreign Application Priority Data

Mar. 30, 2020 (EP) .................................... 20166648

(51) Int. Cl.
*H05B 47/19* (2020.01)

(52) U.S. Cl.
CPC .................................... *H05B 47/19* (2020.01)

(58) Field of Classification Search
CPC .... H05B 47/19; H05B 47/155; H05B 47/115; H05B 47/105; H05B 47/175; H05B 47/11;

(Continued)

(56) References Cited

U.S. PATENT DOCUMENTS 10,051,716 B2 * 8/2018 Newton ................ H05B 47/19
10,339,795 B2 * 7/2019 Crafts .................... H05B 47/19

(Continued)

FOREIGN PATENT DOCUMENTS

WO 2017045885 A1 3/2017
WO 2017063884 A1 4/2017
WO 2018177766 A1 10/2018

*Primary Examiner* — Monica C King

(57) ABSTRACT

A method of commissioning a lighting device in a lighting system comprises receiving (121) a first message from a mobile device (41) on the lighting device (11,13). The first message indicates that the mobile device intends to scan, using the first wireless communication technology, for any lighting device which can be commissioned using the first wireless communication technology. The method further comprises determining (123) whether the lighting device can be commissioned using the first wireless communication technology and controlling (125) a light source to render a light effect upon receipt of the message in dependence on the determination whether the lighting device can be commissioned via the first wireless communication technology. The method also comprises receiving (127) a second message from the mobile device and responding by transmitting (129) a third message confirming that the mobile device can control the lighting device, using the first wireless communication technology.

10 Claims, 6 Drawing Sheets

(58) Field of Classification Search

CPC .... H05B 45/20; H05B 47/125; H05B 47/165; H05B 47/16; H05B 47/1965; H05B 47/195; H05B 45/10; H05B 47/12; H05B 47/199; H05B 47/17; H05B 45/22; H05B 47/10; H05B 47/18; H05B 47/13; H05B 47/20; H05B 47/14; H05B 47/185; H05B 47/135; H05B 45/325; H05B 47/22; H05B 45/12; H05B 45/3725; H05B 45/345; H05B 45/00; H05B 45/18; H05B 45/24; H05B 45/28; H05B 45/357; H05B 45/39; H05B 45/14; H05B 45/37; H05B 45/46; H05B 45/50; H05B 41/36; H05B 41/3921; H05B 45/38; H05B 45/375; H05B 45/60; H05B 44/00; H05B 45/3578; H05B 45/382; H05B 45/385; H05B 45/40; H05B 45/44; H05B 47/29; H05B 41/38; H05B 45/56; H05B 47/00; H05B 45/30; H05B 45/305; H05B 45/355; H05B 45/54; H05B 47/25; H05B 45/3577; H05B 47/196; H05B 47/197; H05B 45/31; H05B 45/33; H05B 45/48; H05B 45/59; H05B 47/198; H05B 47/1995

See application file for complete search history.

(56) References Cited

U.S. PATENT DOCUMENTS

| | | | | |
|---|---|---|---|---|
| 10,524,335 | B1 * | 12/2019 | Thorington | H04W 28/0221 |
| 11,582,058 | B2 * | 2/2023 | Engelen | H04L 12/282 |
| 2012/0215325 | A1 | 8/2012 | Wu | |
| 2015/0076993 | A1 | 3/2015 | Mohan | |
| 2016/0036484 | A1 * | 2/2016 | Sullivan | H04L 12/282 315/291 |
| 2016/0255697 | A1 * | 9/2016 | Bhide | F21V 23/0442 315/161 |
| 2018/0167141 | A1 * | 6/2018 | Schenk | H04B 10/116 |
| 2018/0248760 | A1 | 8/2018 | Deixler et al. | |
| 2018/0270933 | A1 * | 9/2018 | Hu | H04L 41/0893 |
| 2022/0377869 | A1 * | 11/2022 | Rozendaal | H05B 47/19 |

* cited by examiner

CAUSING A LIGHTING DEVICE TO VISUALLY INDICATE WHETHER IT CAN BE COMMISSIONED USING A PARTICULAR WIRELESS TECHNOLOGY

CROSS-REFERENCE TO PRIOR APPLICATIONS

This application is the U.S. National Phase application under 35 U.S.C. § 371 of International Application No. PCT/EP2021/057974, filed on Mar. 26, 2021, which claims the benefit of European Patent Application No. 20166648.4, filed on Mar. 30, 2020. These applications are hereby incorporated by reference herein.

FIELD OF THE INVENTION

The invention relates to a lighting device for use in a lighting system and a mobile device for commissioning said lighting device in said lighting system.

The invention further relates to methods of commissioning a lighting device in a lighting system.

The invention also relates to a computer program product enabling a computer system to perform such methods.

BACKGROUND OF THE INVENTION

In the past, connected devices typically relied on a single wireless communication technology. In the Philips Hue system, connected lighting devices relied on Zigbee communication technology. With the introduction of connected device devices which support multiple wireless communication technologies, the complexity of the ecosystem increases as it transitions from a homogeneous to heterogeneous system. For example, in the Hue system, lighting devices that support both Bluetooth and Zigbee communication technologies have been introduced and two commissioning workflows now exist.

In the Hue system, a user is able to search for all lighting devices that support Zigbee and select a lighting device that he wants to commission in his lighting system from a list of found lighting devices displayed on screen in the user's app. WO 2017/063884 A1 discloses that a bulb can flash or blink to indicate visually to the user that the bulb selected on screen in the app is indeed the bulb being added to the lighting system.

However, in order to commission lighting devices that support Bluetooth in his lighting system, the user needs to approach each of these lighting devices and scan for new lighting devices when a lighting device is in the proximity of the user's mobile device. The reason for this is that the Bluetooth-based commissioning procedure has a proximity-based security requirement and requires that the user must be within 3 feet of the lighting device to have it successfully commissioned.

When the user has both lighting devices that do not support Bluetooth and lighting devices that do support Bluetooth, commissioning the lighting devices that support Bluetooth can become cumbersome. The user likely does not know which lighting devices support Bluetooth-based commissioning and therefore needs to use a trial-and-error method for the commissioning. This may become especially cumbersome if not all lighting devices are easily accessible.

SUMMARY OF THE INVENTION

It is a first object of the invention to provide a mobile device, which makes it relatively easy to commission lighting devices that support different wireless communication technologies in a lighting system.

It is a second object of the invention to provide a lighting device, which makes it relatively easy to commission lighting devices that support different wireless communication technologies in a lighting system.

It is a third object of the invention to provide methods, which make it relatively easy to commission lighting devices that support different wireless communication technologies in a lighting system.

In a first aspect of the invention, a mobile device for commissioning a lighting device in a lighting system using said first wireless communication technology when said lighting device is located within a predetermined distance of said mobile device, said lighting system comprising said lighting device and a further lighting device, and said further lighting device supporting a second wireless communication technology, comprises at least one input interface, at least one output interface, and at least one processor configured to select said first wireless communication technology for commissioning said lighting device and transmit, via said at least one output interface, a message to at least one lighting device to cause said at least one lighting device to render a light effect upon receipt of said message, said at least one lighting device comprising said lighting device and said message not causing said further lighting device to render said light effect, said message indicating that said mobile device intends to scan, using said first wireless communication technology, for any lighting device which can be commissioned using said first wireless communication technology, The processor is further configured to scan, via said at least one input interface, using said first wireless communication technology, for said lighting device located within said predetermined distance of said mobile device, and commission said lighting device to enable said lighting device to be controlled by said mobile device using said first wireless communication technology.

Thus, the mobile device causes one or more lighting devices to provide active feedback to the user to allow him to identify the lighting devices which support a given or user-selected commissioning workflow. Without this active identification, a user would be required to remember information about all the lighting devices and all the workflow they support. For example, if the user has initiated a commissioning workflow using the first wireless communication technology, e.g. Bluetooth, all the devices which support this workflow may use their light source to discern themselves from other lighting devices that do not support this commissioning workflow, e.g. by changing their light source to a blue light setting. This helps the user identify the lighting devices and easily fulfil the workflow requirements like distance from the lighting device (e.g. minimum received signal strength) and thereby makes it relatively easy to commission lighting devices that support different wireless communication technologies in a lighting system.

Said at least one processor may be configured to transmit said message to said at least one lighting device by broadcasting said message using said first wireless communication technology. Alternatively or additionally, said at least one processor may be configured to transmit said message to said at least one lighting device via a bridge.

Said at least one processor may be configured to select said first wireless communication technology for commissioning one or more lighting devices based on user input. For example, a user may select a certain app dedicated to controlling lighting devices using the first wireless communication technology or may select a commissioning workflow that uses the first wireless communication technology in an app that supports multiple commissioning workflows.

In a second aspect of the invention, a lighting device for use in a lighting system, said lighting device supporting a first wireless communication technology, said lighting system comprising said lighting device and a further lighting device, and said further lighting device supporting a second wireless communication technology, comprises at least one light source, at least one input interface, at least one output interface, and at least one processor configured to receive, via said at least one input interface, a first message from a mobile device, said first message indicating that said mobile device intends to scan, using said first wireless communication technology, for any lighting device which can be commissioned using said first wireless communication technology, The processor is further configured to determine whether said lighting device can be commissioned using said first wireless communication technology, control said at least one light source to render a light effect upon receipt of said message in dependence on said determination whether said lighting device can be commissioned via said first wireless communication technology, said first message not causing said further lighting device to render said light effect, receive, via said at least one input interface, using said first wireless communication technology, a second message from said mobile device, and transmit, via said at least one output interface, using said first wireless communication technology, a third message to said mobile device in response to said second message, said third message confirming that said lighting device can be controlled by said mobile device using said first wireless communication technology.

Said at least one processor may be configured to control said at least one light source to render said light effect upon determining that said lighting device can be commissioned via said first wireless communication technology. Alternatively or additionally, said at least one processor may be configured to control said at least one light source to render said light effect or a different light effect upon determining that said lighting device cannot be commissioned via said first wireless communication technology. For example, all lighting devices which can be commissioned via said first wireless communication technology may emit a green light and/or all lighting device which cannot be commissioned via said first wireless communication technology may emit a red light.

Said at least one processor may be configured to receive said first message using said first wireless communication technology. Alternatively or additionally, said at least one processor may be configured to receive said first message via a bridge.

Said at least one processor may be configured to determine a distance between said mobile device and said lighting device based on a signal strength of said first message and determine said light effect to be rendered based on said distance. For example, the light source of a lighting device may flash green and the closer the user gets, the more the light effect changes to constant green light output.

Said at least one processor may be configured to determine a distance between said mobile device and said lighting device based on a signal strength of said second message, determine whether said distance exceeds a predetermined distance and transmit said third message to said mobile device in dependence on said distance not exceeding said predetermined distance. This proximity-based security requirement may be imposed to prevent an authorized person standing outside a house from gaining control of a lighting device which is located inside the house.

In a third aspect of the invention, a system comprises said mobile device and said lighting device.

In a fourth aspect of the invention, a method of commissioning a lighting device in a lighting system using said first wireless communication technology when said lighting device is located within a predetermined distance of said mobile device, said lighting system comprising said lighting device and a further lighting device, and said further lighting device supporting a second wireless communication technology, comprises selecting, on a mobile device, said first wireless communication technology for commissioning said lighting device, and transmitting a message to at least one lighting device to cause said at least one lighting device to render a light effect upon receipt of said message, said at least one lighting device comprising said lighting device and said message not causing said further lighting device to render said light effect, said message indicating that said mobile device intends to scan, using said first wireless communication technology, for any lighting device which can be commissioned using said first wireless communication technology, The method further comprises scanning, using said first wireless communication technology, for said lighting device located within said predetermined distance of said mobile device, and commissioning said lighting device to enable said lighting device to be controlled by said mobile device using said first wireless communication technology. Said method may be performed by software running on a programmable device. This software may be provided as a computer program product.

In a fifth aspect of the invention, a method of commissioning a lighting device in a lighting system, said lighting device supporting a first wireless communication technology, said lighting system comprising said lighting device and a further lighting device, and said further lighting device supporting a second wireless communication technology, comprises receiving, on said lighting device, a first message from a mobile device, said first message indicating that said mobile device intends to scan, using said first wireless communication technology, for any lighting device which can be commissioned using said first wireless communication technology, and determining whether said lighting device can be commissioned using said first wireless communication technology.

The method further comprises, controlling at least one light source to render a light effect upon receipt of said message in dependence on said determination whether said lighting device can be commissioned via said first wireless communication technology, said first message not causing said further lighting device to render said light effect, receiving, using said first wireless communication technology, a second message from said mobile device, and transmitting, using said first wireless communication technology, a third message to said mobile device in response to said second message, said third message confirming that said lighting device can be controlled by said mobile device using said first wireless communication technology. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations for commissioning a lighting device in a lighting system using said first wireless communication technology when said lighting device is located within a predetermined distance of said mobile device, said lighting system comprising said lighting device and a further lighting device, and said further lighting device supporting a second wireless communication technology.

These executable operations comprise selecting, on a mobile device, said first wireless communication technology for commissioning said lighting device, transmitting a message to at least one lighting device to cause said at least one lighting device to render a light effect upon receipt of said message, said at least one lighting device comprising said lighting device and said message not causing said further lighting device to render said light effect, said message indicating that said mobile device intends to scan, using said first wireless communication technology, for any lighting device which can be commissioned using said first wireless communication technology, scanning, using said first wireless communication technology, for said lighting device located within said predetermined distance of said mobile device, and commissioning said lighting device to enable said lighting device to be controlled by said mobile device using said first wireless communication technology.

A non-transitory computer-readable storage medium stores at least a second software code portion, the second software code portion, when executed or processed by a computer, being configured to perform executable operations for commissioning a lighting device in a lighting system, said lighting device supporting a first wireless communication technology, said lighting system comprising said lighting device and a further lighting device, and said further lighting device supporting a second wireless communication technology.

These executable operations comprise receiving, on said lighting device, a first message from a mobile device, said first message indicating that said mobile device intends to scan, using said first wireless communication technology, for any lighting device which can be commissioned using said first wireless communication technology, determining whether said lighting device can be commissioned using said first wireless communication technology, controlling at least one light source to render a light effect upon receipt of said message in dependence on said determination whether said lighting device can be commissioned via said first wireless communication technology, said first message not causing said further lighting device to render said light effect, receiving, using said first wireless communication technology, a second message from said mobile device, and transmitting, using said first wireless communication technology, a third message to said mobile device in response to said second message, said third message confirming that said lighting device can be controlled by said mobile device using said first wireless communication technology.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(™), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
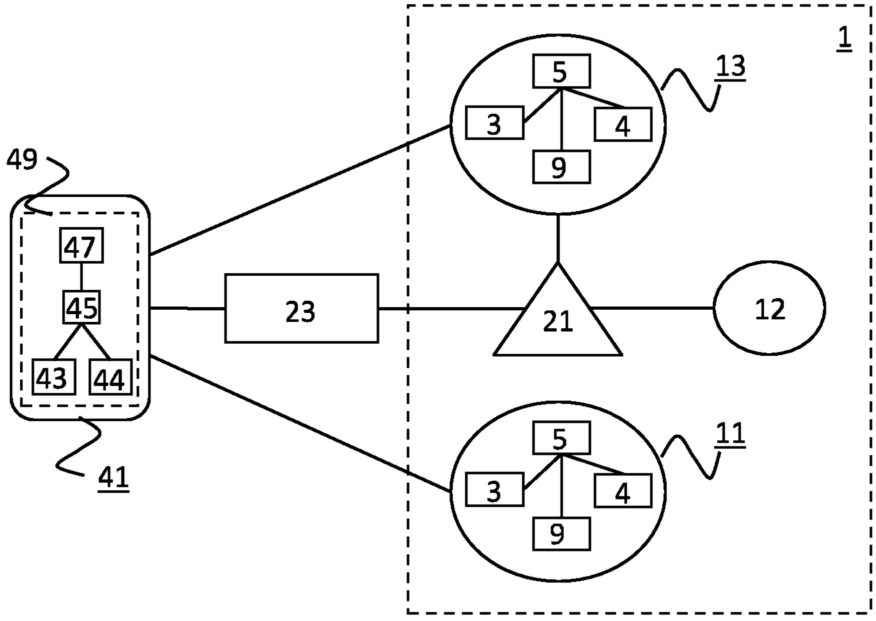
FIG. 1 is a block diagram of an embodiment of the mobile device and an embodiment of the lighting device.

FIG. 1 shows an embodiment of the lighting device for use in a lighting system and an embodiment of the mobile device for commissioning the lighting device in the lighting system. A lighting system 1 comprises a bridge 21 and three lighting devices 11-13. Bridge 21 may be a Hue bridge and lighting devices 11-13 may be Hue lamps, for example. A mobile device 41, e.g. a mobile phone or tablet, is used for commissioning one or more of the lighting devices 11-13. Mobile device 41 and one or more of the lighting devices 11-13 may be part of a single system.

Lighting devices 11 and 13 support a first wireless communication technology, e.g. Bluetooth. Lighting devices 12 and 13 support a second wireless communication technology, e.g. Zigbee. Bridge 21 communicates directly with the lighting devices 12 and 13 using the second wireless communication technology. Mobile device 41 communicates directly with the lighting devices 11 and 13 using the first wireless communication technology. Mobile device 41 is connected to the wireless LAN access point 23, e.g. via Wi-Fi, and bridge 21 is also connected to the wireless LAN access point 23, e.g. via Wi-Fi or Ethernet.

Lighting devices are commissioned with respect to the first wireless communication technology using a first method and commissioning flow and with respect to the second wireless communication technology using a second method and commissioning flow. For example, a first app may be used on the mobile device 41 to commission lighting devices using the first method and a second app may be used on the mobile device 41 to commission lighting devices using the second method. Alternatively, a user may be able to choose from multiple commissioning flows in a single app, for example.

In the example of FIG. 1, lighting devices 12 and 13 identify themselves to the bridge 21 using the second wireless communication technology. For example, lighting devices 12 and 13 may regularly broadcast a message indicating their presence or may respond to a message broadcast by bridge 21. Mobile device 41 can control lighting devices 12 and 13 as soon the bridge 21 has been connected to (an app running on) mobile device 41 and lighting devices have been added to the lighting system. For example, the user may be able to search for bridges using an app on mobile device 41, press a button on bridge 21 after it has been found, search for available lighting devices with the app, and add any new lighting devices that have been found. This completes the commissioning of lighting system 1 with respect to the second wireless communication technology, i.e. the second commissioning flow.

To commission lighting devices 11 and 13 with respect to the first wireless communication technology, the user needs to approach each of lighting devices 11 and 13 with his mobile device 41 and scan for lighting devices supporting the first wireless communication technology. After doing this for each lighting device separately, the user can control lighting devices 11 and 13 with mobile device 41 via the first wireless communication technology. Since the user might not be able to tell from the appearance of lighting devices 11-13 which one(s) can be commissioned using the first wireless communication technology, the user may need to approach all three lighting devices 11-13.

The mobile device 41 comprises a receiver 43, a transmitter 44, a processor 45, memory 47, and a display 49. To make it easier to commission the lighting devices 11 and 13 with respect to the first wireless communication technology, the processor 45 is configured, e.g. by installing a suitable app, to select the first wireless communication technology for commissioning one or more lighting devices supporting the first wireless communication technology, e.g. based on user input, and transmit, via the transmitter 44, a message to at least one lighting device to cause the at least one lighting device to render a light effect upon receipt of the message. The message does not cause lighting device 12 to render the light effect, i.e. the same light effect. The message may cause lighting device 12 to render no light effect or a different light effect or may have no impact on lighting device 12.

The message may be transmitted to lighting devices 11 and 13 directly using the first wireless communication technology and/or to the lighting devices 12 and 13 via bridge 21, for example. If bridge 21 supports the first wireless communication technology, the message may also be transmitted to lighting device 11 via bridge 21.

The message indicates that the mobile device 41 intends to scan, using the first wireless communication technology, for a lighting device which can be commissioned using the first wireless communication technology. This (first) message may comprise a certain flag, for example, which a lighting device understands to mean that a mobile device intends to perform a scan. The processor 45 is further configured to scan, via the receiver 3 (and optionally the transmitter 4), using the first wireless communication technology, for a lighting device which can be commissioned using the first wireless communication technology and which is located within a predetermined distance of the mobile device 41, and commission the lighting device to enable the lighting device to be controlled by the mobile device 41 using the first wireless communication technology.

In the example of FIG. 1, lighting device 11 and lighting device 13 can be commissioned by mobile device 41 with respect to the first wireless communication technology. The lighting devices 11 and 13 each comprise a receiver 3, a transmitter 4, a processor 5, and a light source 9. To make it easier to commission the lighting devices 11 and 13 with respect to the first wireless communication technology, the processor 5 is configured to receive, via the receiver 3, a first message from the mobile device 41. The first message indicates that the mobile device 41 intends to scan, using the first wireless communication technology, for a lighting device which can be commissioned using the first wireless communication technology. This (first) message may comprise a certain flag, for example, which the lighting device understands to mean that a mobile device intends to perform a scan. The processor 5 is further configured to determine whether the lighting device can be commissioned using the first wireless communication technology.

The processor 5 is further configured to control the light source 9 to render a light effect upon receipt of the message in dependence on the determination whether the lighting device can be commissioned via the first wireless communication technology, receive, via the receiver 3, using the first wireless communication technology, a second message from the mobile device 41, and transmit, via the transmitter 4, using the first wireless communication technology, a third message to the mobile device 41 in response to the second message. The third message confirms that the lighting device can be controlled by the mobile device 41 using the first wireless communication technology.

After lighting devices 11 and 13 have been commissioned, the first commissioning flow is completed. Then, if not performed already, the second commissioning flow may be started and lighting device 12 may be commissioned using the second wireless communication technology. After the first commissioning flow has been completed, the mobile device 41 may cause all lighting devices which can only be commissioned using the second wireless communication technology (lighting device 12 in the example of FIG. 1) to render a light effect to remind the user which lighting device(s) may still need to be commissioned.

In the embodiment of the lighting devices 11 and 13 shown in FIG. 1, the lighting devices 11 and 13 each comprises one processor 5. In an alternative embodiment, one or more of the lighting devices 11 and 13 comprises multiple processors. The processor 5 of the lighting devices 11 and 13 may be a general-purpose processor or an application-specific processor. The receiver 3 and the transmitter 4 may support one or more wireless communication technologies, e.g. Zigbee for communicating with bridge 21 and/or Bluetooth for communication with mobile device 41. In an alternative embodiment, multiple receivers and/or multiple transmitters are used instead of a single receiver and a single transmitter.

In the embodiment shown in FIG. 1, a separate receiver and a separate transmitter are used. In an alternative embodiment, the receiver 3 and the transmitter 4 are combined into a transceiver. The lighting devices 11 and 13 may comprise other components typical for a connected lighting device such as a power connector and a memory. The invention may be implemented using a computer program running on one or more processors.

In the embodiment of the mobile device 41 shown in FIG. 1, the mobile device 41 comprises one processor 45. In an alternative embodiment, the mobile device 41 comprises multiple processors. The processor 45 of the mobile device 41 may be a general-purpose processor, e.g. from ARM or Qualcomm, or an application-specific processor. The processor 45 of the mobile device 41 may run an Android or iOS operating system for example. The display 49 may comprise an LCD or OLED display panel, for example. The display 49 may be a touch screen display, for example. The memory 47 may comprise one or more memory units. The memory 47 may comprise solid state memory, for example.

The receiver 43 and the transmitter 44 may support one or more wireless communication technologies, e.g. Wi-Fi (IEEE 802.11) for communicating with the wireless LAN access point 23 and Bluetooth for communication with lighting devices 11 and 13, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 43 and the transmitter 44 are combined into a transceiver. The mobile device 41 may comprise other components typical for a mobile device such as a battery and a power connector. The invention may be implemented using a computer program running on one or more processors.

Figure 2:
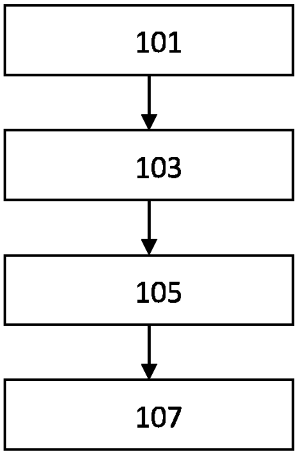
FIG. 2 is a flow diagram of a first part of a first embodiment of the method.

A first part of a first embodiment of the method of commissioning a lighting device in a lighting system is shown in FIG. 2. The lighting device supports a first wireless communication technology. The lighting system comprises the lighting device and a further lighting device. The further lighting device supports a second wireless communication technology.

A step 101 comprises selecting, on a mobile device, the first wireless communication technology for commissioning one or more lighting devices supporting the first wireless communication technology. A step 103 comprises transmitting a message to at least one lighting device to cause the at least one lighting device to render a light effect upon receipt of the message. The message does not cause the further lighting device to render the light effect, i.e. the same light effect. The message may cause the further lighting device to render no light effect or a different light effect or may have no impact on lighting device. The message indicates that the mobile device intends to scan, using the first wireless communication technology, for any lighting device which can be commissioned using the first wireless communication technology.

A step 105 comprises scanning, using the first wireless communication technology, for any lighting device which can be commissioned using the first wireless communication technology and which is located within a predetermined distance of the mobile device. A step 107 comprises commissioning the lighting device to enable the lighting device to be controlled by the mobile device using the first wireless communication technology.

Figure 3:
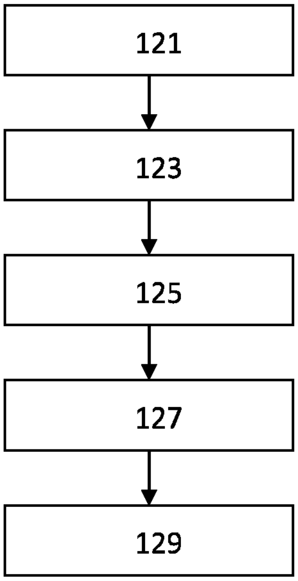
FIG. 3 is a flow diagram of a second part of the first embodiment of the method.

A second part of the first embodiment of the method of commissioning a lighting device in a lighting system is shown in FIG. 3. A step 121 comprises receiving, on the lighting device, a first message from a mobile device. The first message indicates that the mobile device intends to scan, using the first wireless communication technology, for any lighting device which can be commissioned using the first wireless communication technology.

A step 123 comprises determining whether the lighting device can be commissioned using the first wireless communication technology. A step 125 comprises controlling at least one light source to render a light effect upon receipt of the message in dependence on the determination whether the lighting device can be commissioned via the first wireless communication technology.

A step 127 comprises receiving, using the first wireless communication technology, a second message from the mobile device. A step 129 comprises transmitting, using the first wireless communication technology, a third message to the mobile device in response to the second message. The third message confirms that the lighting device can be controlled by the mobile device using the first wireless communication technology.

Figure 4:
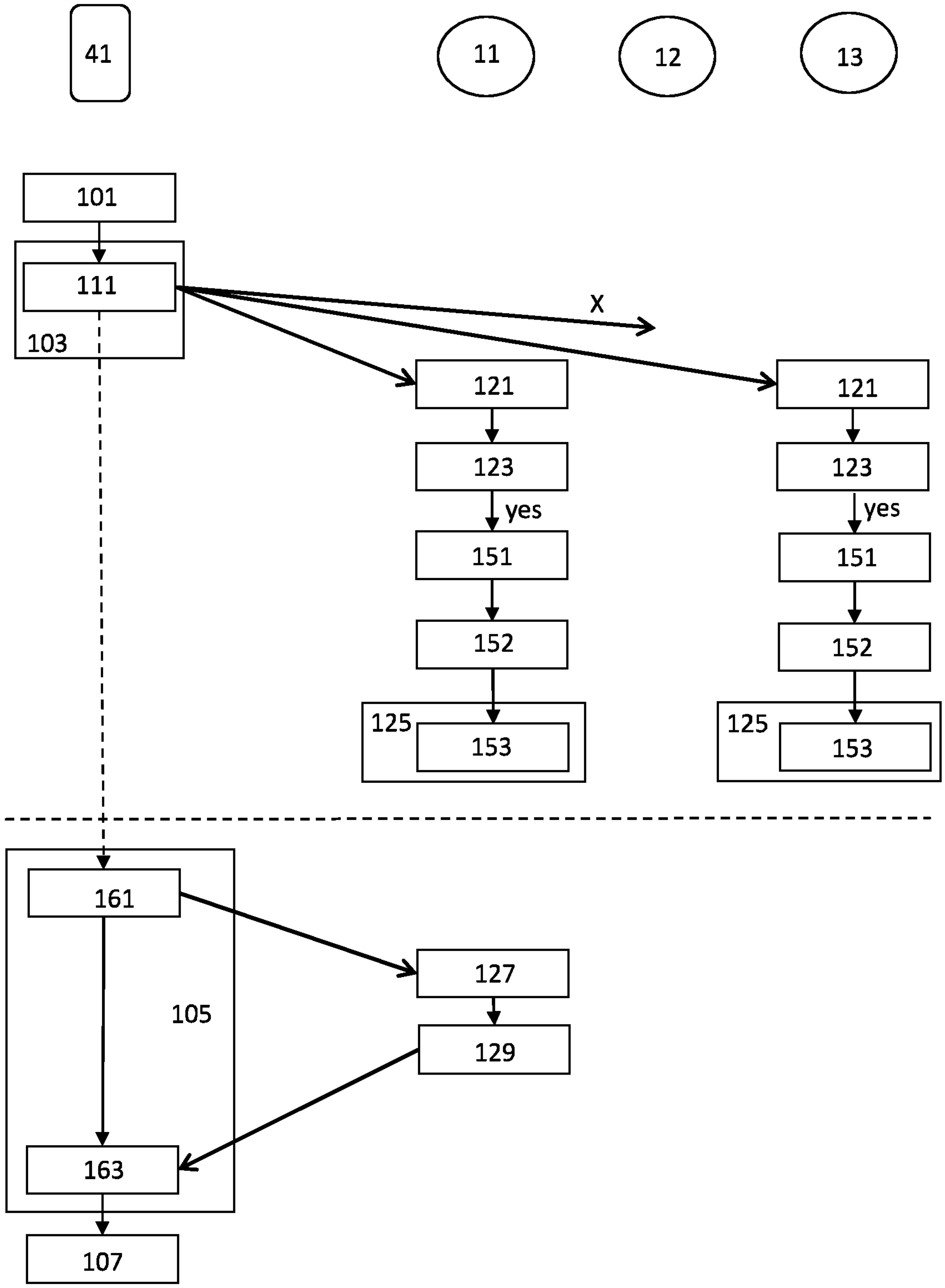
FIG. 4 is a flow diagram of a second embodiment of the method.

A second embodiment of the method of commissioning a lighting device in a lighting system is shown in FIG. 4. The lighting system comprises lighting devices 11-13. Lighting devices 11 and 13 support a first wireless communication technology, e.g. Bluetooth. Lighting devices 12 and 13 support a second wireless communication technology, e.g. Zigbee.

Mobile device 41 performs a step 101 of selecting the first wireless communication technology for commissioning one or more lighting devices supporting the first wireless communication technology, e.g. based on user input. For example, a user may start an app for controlling lighting devices via the first wireless communication technology and select a commissioning function in the app.

Mobile device 41 then performs a step 103 of transmitting a first message to at least one lighting device to cause the at least one lighting device to render a light effect upon receipt of the message. The first message indicates that the mobile device intends to scan, using the first wireless communication technology, for any lighting device which can be commissioned using the first wireless communication technology.

In the embodiment of FIG. 4, step 103 is implemented by a step 111. In step 111, mobile device 41 transmits the first message to the at least one lighting device by broadcasting the first message using the first wireless communication technology. Lighting devices 11 and 13 receive this message in step 121. Lighting device 12 does not receive this message (indicated by the X in FIG. 4), as it does not support the first wireless communication technology.

Lighting devices 11 and 13 then perform step 123 of determining whether the lighting device can be commissioned using the first wireless communication technology. As a first example, if a lighting device supports commissioning using the first wireless communication technology whenever it supports the first wireless communication technology, step 123 may be the simple step of determining whether the lighting device is able to process/understand the received message.

As a second example, step 123 may comprise the lighting device reading a configuration setting to determine whether it is able to support commissioning using the first wireless communication technology. For instance, a user or manufacturer may specify that if a lighting device supports both the first and second wireless communication technologies, the lighting device can only be commissioned using the second wireless communication technology.

In the example of FIG. 4, lighting devices 11 and 13 both support commissioning using the first wireless communication technology and therefore both perform steps 151 and 152 next. Step 151 comprises determining a distance between mobile device 41 and the lighting device based on a signal strength of the first message. Step 152 comprises determining a light effect to be rendered based on the distance determined in step 151.

Then, lighting devices 11 and 13 perform a step 125 of controlling at least one light source to render a light effect upon receipt of the message in dependence on the determination whether the lighting device can be commissioned via the first wireless communication technology. In the example of FIG. 4, lighting devices 11 and 13 perform a step 153 as part of step 125. Step 153 comprises rendering the light effect determined in step 152. Thus, in the embodiment of FIG. 4, light sources of lighting devices 11 and 13 are controlled to render a light effect upon determining that the lighting device can be commissioned via the first wireless communication technology.

After seeing that a light effect is rendered by lighting devices 11 and 13, the user approaches one of these lighting devices, e.g. the nearest one. In the example of FIG. 4, the user approaches lighting device 11. The mobile device 41 may perform step 105 automatically after it has performed step 103 or it may perform step 105 after receiving user input, e.g. after a user has pressed a scanning button.

Step 105 comprises scanning, using the first wireless communication technology, for any lighting device which can be commissioned using the first wireless communication technology and which is located within a predetermined distance of the mobile device. In the embodiment of FIG. 4, step 105 is implemented by steps 161 and 163. Step 161 comprises broadcasting a second message using the first wireless communication technology.

In the example of FIG. 4, only lighting device 11 performs step 127 of receiving the second message. For example, the second message may be transmitted with a low transmission power such that lighting device 13 does not receive the second message. The lighting device 11 then performs the step of transmitting, using the first wireless communication technology, a third message to mobile device 41 in response to the second message. The third message confirms that lighting device 11 can be controlled by mobile device 41 using the first wireless communication technology. This third message is received by mobile device 41 in step 163.

Next, mobile device 41 performs a step 107 of commissioning the lighting device 11 to enable the lighting device 11 to be controlled by the mobile device 41 using the first wireless communication technology. The lighting device 11 may be commissioned by adding its details to a configuration of an app on the mobile device 41. This configuration may be stored on the mobile device 41 or on an Internet server, i.e. in the cloud, for example.

Figure 5:
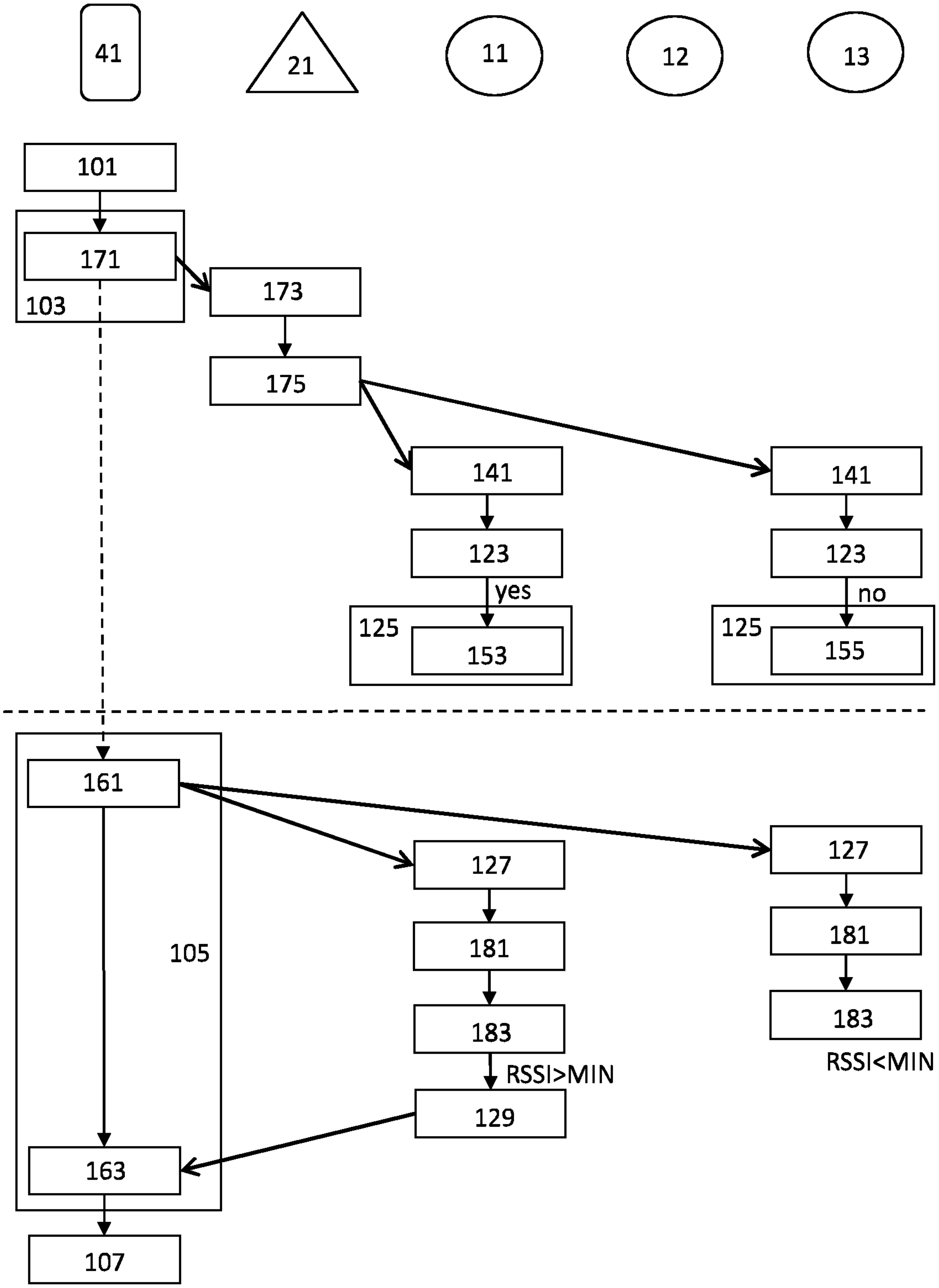
FIG. 5 is a flow diagram of a third embodiment of the method.

A third embodiment of the method of commissioning a lighting device in a lighting system is shown in FIG. 5. In the embodiment of FIG. 5, step 103 is implemented by a step 171 instead of by step 111 of FIG. 4. In step 171, mobile device 41 transmits a message to the at least one lighting device via a bridge 21, e.g. using the second wireless communication technology. The bridge 21 receive this message in step 173 and transmits a first message to the lighting devices 11 and 13, which have previously identified themselves to bridge 21 via the first wireless communication technology and/or have informed the bridge 21 that they support the first wireless communication technology. Lighting devices 11 and 13 receive this message in step 141.

In the example of FIG. 5, bridge 21 supports both the first and second wireless communication technologies. Bridge 21 transmits the first message to lighting device 11 using the first wireless communication technology and to lighting device 13 using either the first wireless communication technology or the second wireless communication technology.

Lighting devices 11 and 13 then perform step 123, which was described in relation to FIG. 4. In the example of FIG. 5, lighting device 11 supports commissioning using the first wireless communication technology and therefore performs a step 153 as part of step 125. In the example of FIG. 5, lighting device 13 does not support commissioning using the first wireless communication technology, e.g. because it only supports commissioning using the second wireless communication technology, and therefore performs a step 155 as part of step 125.

Step 153 comprises rendering a light effect, e.g. by changing a color setting to blue. Step 155 comprises rendering no light effect. For example, lighting device 13 may turn off its light source(s) in step 155. Thus, in the embodiment of FIG. 5, the light source(s) of lighting device 11 is/are controlled to render a light effect upon determining that the lighting device can be commissioned via the first wireless communication technology.

After seeing that a light effect is rendered by lighting device 11, the user approaches lighting device 11. In the embodiment of FIG. 5, step 105 is again implemented by steps 161 and 163. Step 161 comprises broadcasting the second message using the first wireless communication technology.

In the example of FIG. 5, both lighting devices 11 perform step 127, i.e. receive the second message, and then perform a step 181. Step 181 comprises determining a distance between mobile device 41 and the lighting device based on a signal strength of the second message. Step 183 comprises determining whether this distance exceeds a predetermined distance, e.g. whether the Received Signal Strength Indicator (RSSI) is below a predetermined minimum. If not, then lighting device 11 performs step 129 of FIG. 4.

In the example of FIG. 5, lighting device 11 determines that the distance between mobile device 41 and lighting device 11 does not exceed the predetermined minimum and lighting device 13 determines that the distance between mobile device 41 and lighting device 13 exceeds the predetermined minimum. Therefore, only lighting device 11 performs step 129. Lighting device 11 may add mobile device 41 to a list of devices that are allowed to control the lighting device 41, in step 129 or in a separate step. This list may be stored in the lighting device 11 itself, for example. Next, mobile device 41 performs steps 163 and 107 as described in relation to FIG. 4.

Figure 6:
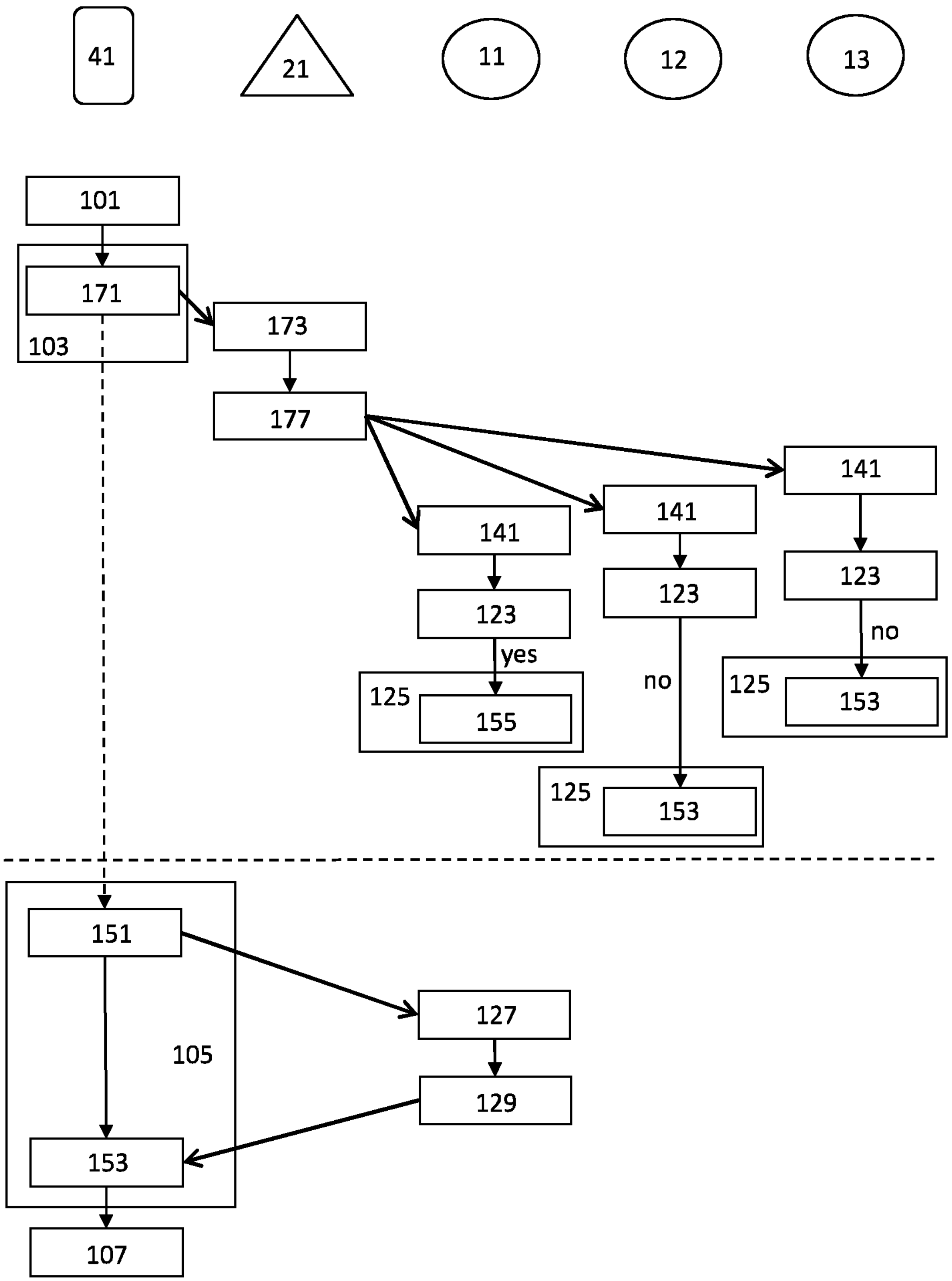
FIG. 6 is a flow diagram of a fourth embodiment of the method.

A fourth embodiment of the method of commissioning a lighting device in a lighting system is shown in FIG. 6. In the embodiment of FIG. 6, steps 101, 171 and 173 are performed as described in relation to FIG. 5, but a step 177 is performed by bridge 21 after step 173 instead of step 175 of FIG. 5. In step 177, bridge 21 transmits the first message to all lighting devices which have previously identified themselves to bridge 21, i.e. lighting devices 11-13 in this example. Lighting devices 11-13 receive this message in step 141.

In the example of FIG. 6, bridge 21 supports both the first and second wireless communication technologies. Bridge 21 transmits the first message to lighting device 11 using the first wireless communication technology, to lighting device 12 using the second wireless communication technology and to lighting device 13 using either the first wireless communication technology or the second wireless communication technology.

Lighting devices 11 and 13 then perform step 123, which was described in relation to FIG. 4. In the example of FIG. 6, lighting device 11 supports commissioning using the first wireless communication technology and therefore performs step 155 as part of step 125. Step 155 comprises rendering no light effect, e.g. lighting device 11 turning off its light source(s). In the example of FIG. 6, lighting device 12 does not support the first wireless communication technology, and thus does not support commissioning using the first wireless communication technology, and therefore performs step 153 as part of step 125.

In the example of FIG. 6, lighting device 13 does not support commissioning using the first wireless communication technology, e.g. because it only supports commissioning using the second wireless communication technology, and therefore performs step 153 as part of step 125. Step 153 comprises rendering a light effect. Thus, in the embodiment of FIG. 6, light sources of lighting devices 12 and 13 are controlled to render a light effect upon determining that the lighting device cannot be commissioned via the first wireless communication technology. After the above-described steps, the method proceeds as shown in, and described in relation to, FIG. 4.

After lighting device 11 has been commissioned using the first wireless communication technology, and thus all lighting devices supporting the first wireless communication technology have been commissioned, lighting devices 12 and 13 may be commissioned. The lighting devices 12 and 13 may stop rendering the lighting effect in step 153 after a while and start again after the first commissioning flow has been completed to indicate which lighting devices may still need to be commissioned in the second commissioning flow. Mobile device 41 may transmit another message to cause lighting devices 12 and 13 to (re)start the rendering of the light effect.

The embodiments of FIGS. 2 to 6 differ from each other in multiple aspects, i.e. multiple steps have been added or replaced. In variations on these embodiments, only a subset of these steps is added or replaced and/or one or more steps may be omitted. For example, steps 181 and 183 of the third embodiment of FIG. 5 may be added to the second embodiment of FIG. 4 and/or step 151 may be omitted from the second embodiment of FIG. 4.

Figure 7:
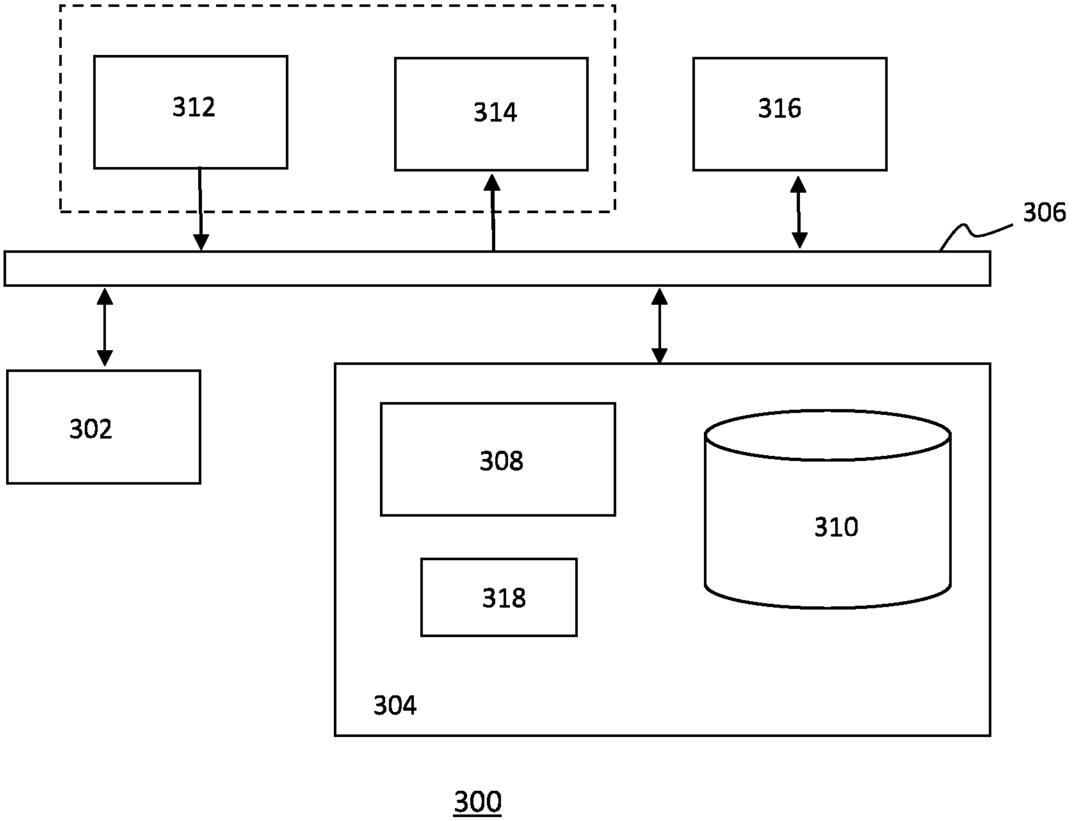
FIG. 7 is a block diagram of an exemplary data processing system for performing the method of the invention.

FIG. 7 depicts a block diagram illustrating an exemplary data processing system that may perform the method as described with reference to FIGS. 2 to 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 7 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system comprising a mobile device and a lighting system, wherein the mobile device is for commissioning a lighting device in the lighting system using a first wireless communication technology when said lighting device is located within a predetermined distance of said mobile device, said lighting system comprising said lighting device and a further lighting device, said further lighting device supporting a second wireless communication technology, wherein said mobile device comprises:

at least one mobile device input interface;

at least one mobile device output interface; and at least one mobile device processor configured to:

select said first wireless communication technology for commissioning said lighting device, transmit, via said at least one mobile device output interface, a message to at least one lighting device to cause said at least one lighting device to render a light effect upon receipt of said message, said at least one lighting device comprising said lighting device and said message not causing said further lighting device to render said light effect, said message indicating that said mobile device intends to scan, using said first wireless communication technology, for any lighting device which can be commissioned using said first wireless communication technology, scan, via said at least one mobile device input interface, using said first wireless communication technology, for said lighting device located within said predetermined distance of said mobile device, and commission said lighting device to enable said lighting device to be controlled by said mobile device using said first wireless communication technology; and wherein said lighting device comprises:

at least one light source;

at least one lighting device input interface;

at least one lighting device output interface; and at least one lighting device processor configured to:

receive using said first wireless communication technology, via said at least one lighting device input interface, a first message from said mobile device, said first message indicating that said mobile device intends to scan, using said first wireless communication technology, for any lighting device which can be commissioned using said first wireless communication technology, determine whether said lighting device can be commissioned using said first wireless communication technology, control said at least one light source to render a light effect upon receipt of said message in dependence on said determination whether said lighting device can be commissioned via said first wireless communication technology, said first message not causing said further lighting device to render said light effect, receive, via said at least one lighting device input interface, using said first wireless communication technology, a second message from said mobile device, and transmit, via said at least one lighting device output interface, using said first wireless communication technology, a third message to said mobile device in response to said second message, said third message confirming that said lighting device can be controlled by said mobile device using said first wireless communication technology.

2. The system as claimed in claim 1, wherein said at least one lighting device processor is configured to control said at least one light source to render said light effect upon determining that said lighting device can be commissioned via said first wireless communication technology.

3. The system as claimed in claim 1, wherein said at least one lighting device processor is configured to control said at least one light source to render said light effect upon determining that said lighting device cannot be commissioned via said first wireless communication technology.

4. The system as claimed in claim 1, wherein said at least one mobile device processor is configured to determine a distance between said mobile device and said lighting device based on a signal strength of said first message and determine said light effect to be rendered based on said distance.

5. The system as claimed in claim 1, wherein said at least one mobile device processor is configured to determine a distance between said mobile device and said lighting device based on a signal strength of said second message, determine whether said distance exceeds a predetermined distance and transmit said third message to said mobile device in dependence on said distance not exceeding said predetermined distance.

6. The system as claimed in claim 1, wherein said at least one mobile device processor is configured to transmit said message to said at least one lighting device by broadcasting said message using said first wireless communication technology.

7. The system as claimed in claim 1, wherein said at least one mobile device processor is configured to transmit said message to said at least one lighting device via a bridge.

8. The system as claimed in claim 1, wherein said at least one mobile device processor is configured to select said first wireless communication technology for commissioning one or more lighting devices based on user input.

9. A method of commissioning a lighting device in a lighting system using a first wireless communication technology when said lighting device is located within a predetermined distance of said mobile device, said system comprising said mobile device and a lighting system, said lighting system comprising said lighting device and a further lighting device, said further lighting device supporting a second wireless communication technology, said method comprising:

selecting, on a mobile device, said first wireless communication technology for commissioning said lighting device;

transmitting a message to at least one lighting device to cause said at least one lighting device to render a light effect upon receipt of said message, said at least one lighting device comprising said lighting device and said message not causing said further lighting device to render said light effect, said message indicating that said mobile device intends to scan, using said first wireless communication technology, for any lighting device which can be commissioned using said first wireless communication technology;

scanning, using said first wireless communication technology, for said lighting device located within said predetermined distance of said mobile device;

commissioning said lighting device to enable said lighting device to be controlled by said mobile device using said first wireless communication technology receiving using said first wireless communication technology, on said lighting device, a first message from a mobile device, said first message indicating that said mobile device intends to scan, using said first wireless communication technology, for any lighting device which can be commissioned using said first wireless communication technology;

determining whether said lighting device can be commissioned using said first wireless communication technology;

controlling at least one light source to render a light effect upon receipt of said message in dependence on said determination whether said lighting device can be commissioned via said first wireless communication technology, said first message not causing said further lighting device to render said light effect;

receiving, using said first wireless communication technology, a second message from said mobile device; and transmitting, using said first wireless communication technology, a third message to said mobile device in response to said second message, said third message confirming that said lighting device can be controlled by said mobile device using said first wireless communication technology.

10. A non-transitory computer readable medium comprising instructions which, when the instructions are executed by a processor of a computing device cause the processor to perform the method of claim 9.

* * * * *